(12) United States Patent
Awamoto et al.

(10) Patent No.: US 8,796,949 B2
(45) Date of Patent: Aug. 5, 2014

(54) ULTRAVIOLET LIGHT IRRADIATION DEVICE

(75) Inventors: Kenji Awamoto, Kobe (JP); Bingang Guo, Kobe (JP); Koji Shinohe, Kobe (JP); Tsutae Shinoda, Kobe (JP); Yoshitaka Chigi, Himeji (JP); Tetsuro Nishimoto, Himeji (JP); Hiroyuki Tanaka, Himeji (JP); Mikihiro Kobayashi, Himeji (JP)

(73) Assignees: Shinoda Plasma Co., Ltd., Kobe (JP); Yumex Inc., Himeji (JP)

( * ) Notice: Subject to any disclaimer, the term of this patent is extended or adjusted under 35 U.S.C. 154(b) by 532 days.

(21) Appl. No.: 13/045,954

(22) Filed: Mar. 11, 2011

(65) Prior Publication Data

US 2011/0227501 A1 Sep. 22, 2011

(30) Foreign Application Priority Data

Mar. 17, 2010 (JP) ................. 2010-061453

(51) Int. Cl.
*H05B 37/02* (2006.01)

(52) U.S. Cl.
USPC ........................... 315/294; 315/287; 315/297

(58) Field of Classification Search
USPC .............. 315/169.4, 287, 291, 294, 297, 307, 315/360; 313/51, 485, 582
See application file for complete search history.

(56) References Cited

U.S. PATENT DOCUMENTS

| | | | |
|---|---|---|---|
| 6,914,382 B2 | 7/2005 | Ishimoto et al. | |
| 6,930,442 B2 * | 8/2005 | Awamoto et al. | ............... 313/51 |
| 7,241,306 B2 | 7/2007 | Minamoto et al. | |
| 8,106,586 B1 * | 1/2012 | Wedding et al. | ............... 313/582 |
| 2004/0249423 A1 | 12/2004 | Savage | |
| 2006/0009822 A1 | 1/2006 | Savage et al. | |
| 2006/0061305 A1 * | 3/2006 | Ahn et al. | ...................... 315/312 |
| 2009/0058768 A1 * | 3/2009 | Ishimoto et al. | ................. 345/60 |
| 2010/0019685 A1 * | 1/2010 | Kominami et al. | ........... 315/250 |
| 2010/0194674 A1 | 8/2010 | Nishihara et al. | |

FOREIGN PATENT DOCUMENTS

| | | |
|---|---|---|
| EP | 0744191 | 11/1996 |
| JP | 09038179 | 2/1997 |
| JP | 2000-193799 | 7/2000 |
| JP | 2000315460 | 11/2000 |
| JP | 2002-298783 | 10/2002 |
| JP | 2003-338244 | 11/2003 |
| JP | 2004-79281 | 3/2004 |
| JP | 2004-170074 | 6/2004 |
| JP | 2004350946 | 12/2004 |
| JP | 2006-102165 | 4/2006 |
| JP | 2007-242363 | 9/2007 |

(Continued)

*Primary Examiner* — Tung X Le
(74) *Attorney, Agent, or Firm* — Staas & Halsey LLP

(57) ABSTRACT

The present invention provides an ultraviolet light irradiation device having a planer UV light source in which the irradiation intensity of UV light can be adjusted finely in a wider range. The ultraviolet light irradiation device of the present invention comprises an UV light source and a housing that holds the planer UV light source. In the UV light source, a plurality of thin plasma tubes, each of which has an UV phosphor layer formed therein, are arranged in parallel with each other on an electrode support sheet, and drive circuits apply a pulse voltage to electrode pairs provided between the electrode support sheet and an array of the thin plasma tubes. A control circuit controls a factor of the pulse voltage to be applied to the electrode pairs so as to adjust the irradiation intensity of the UV light.

6 Claims, 14 Drawing Sheets

(56) References Cited

FOREIGN PATENT DOCUMENTS

| | | |
|---|---|---|
| JP | 2007-526003 A | 9/2007 |
| JP | 2009-186403 | 8/2009 |
| JP | 2011-40271 | 2/2011 |
| WO | 2009/078199 A1 | 6/2009 |

\* cited by examiner

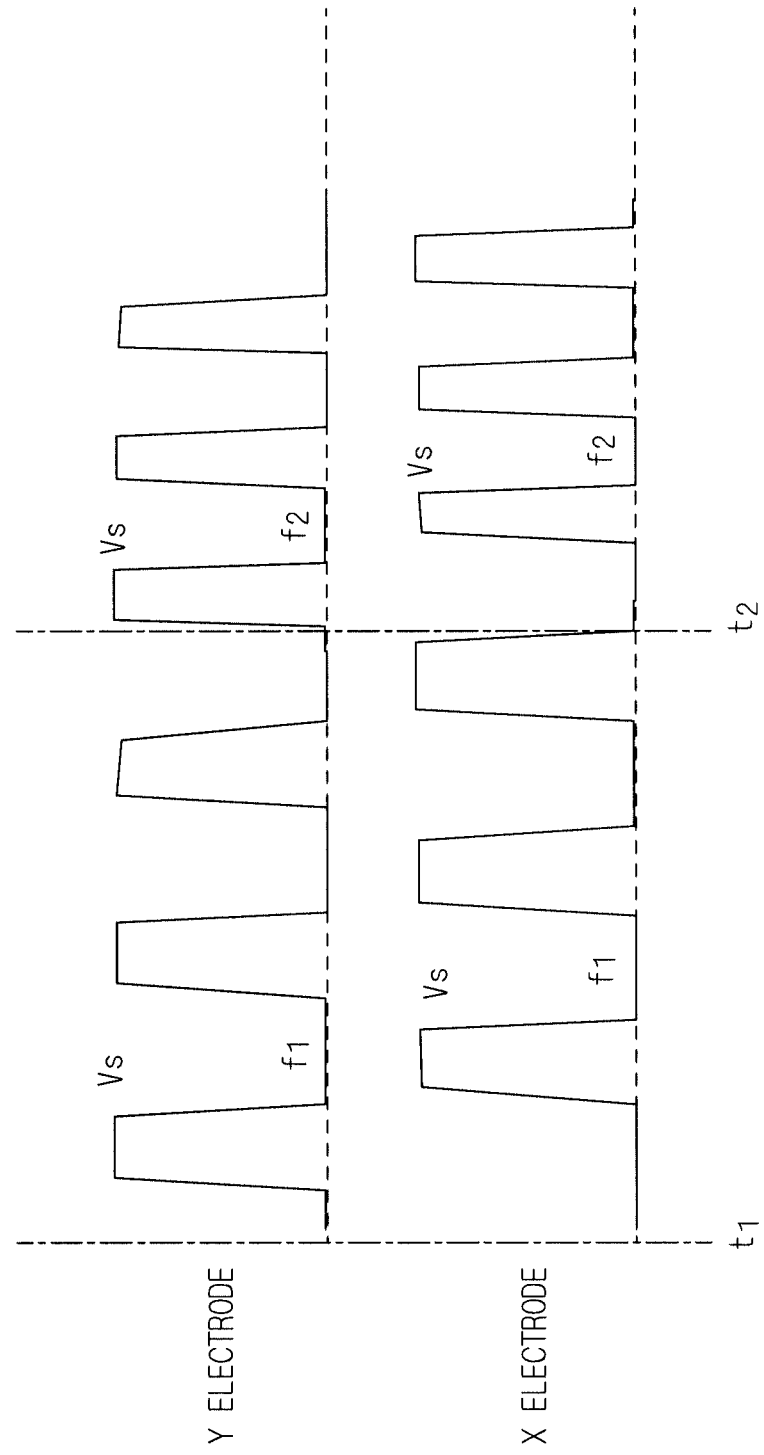

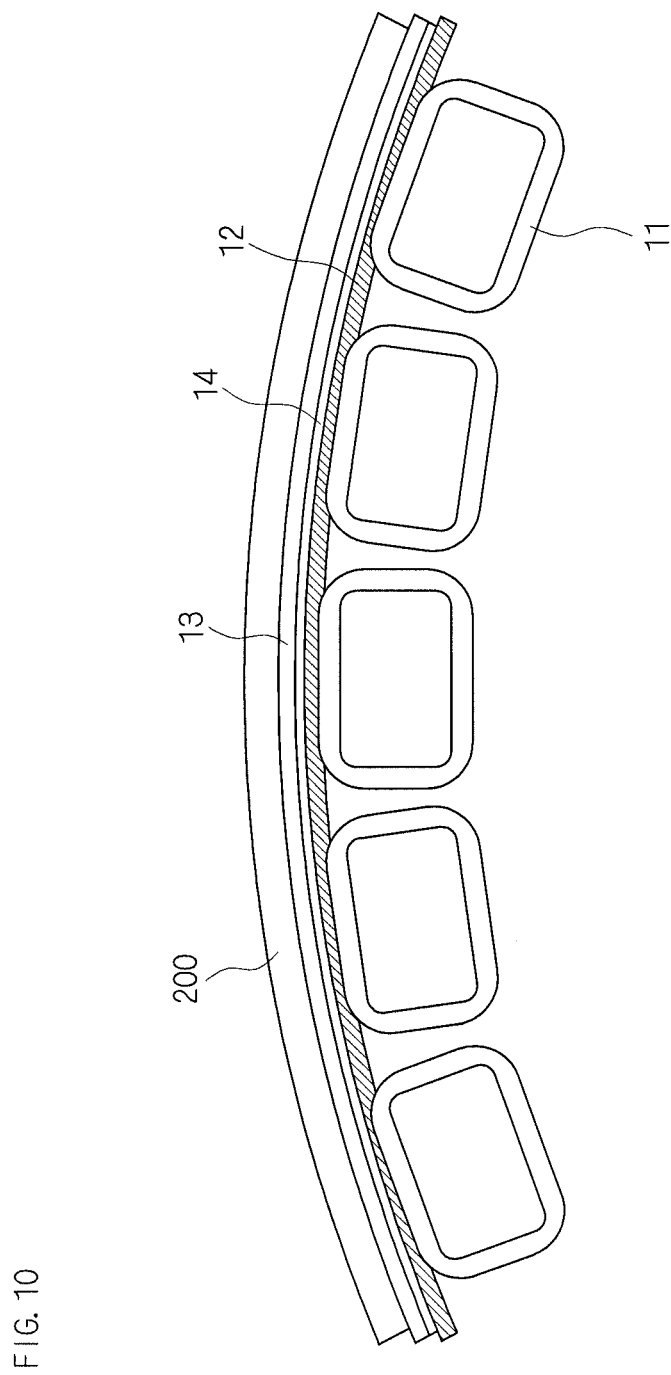

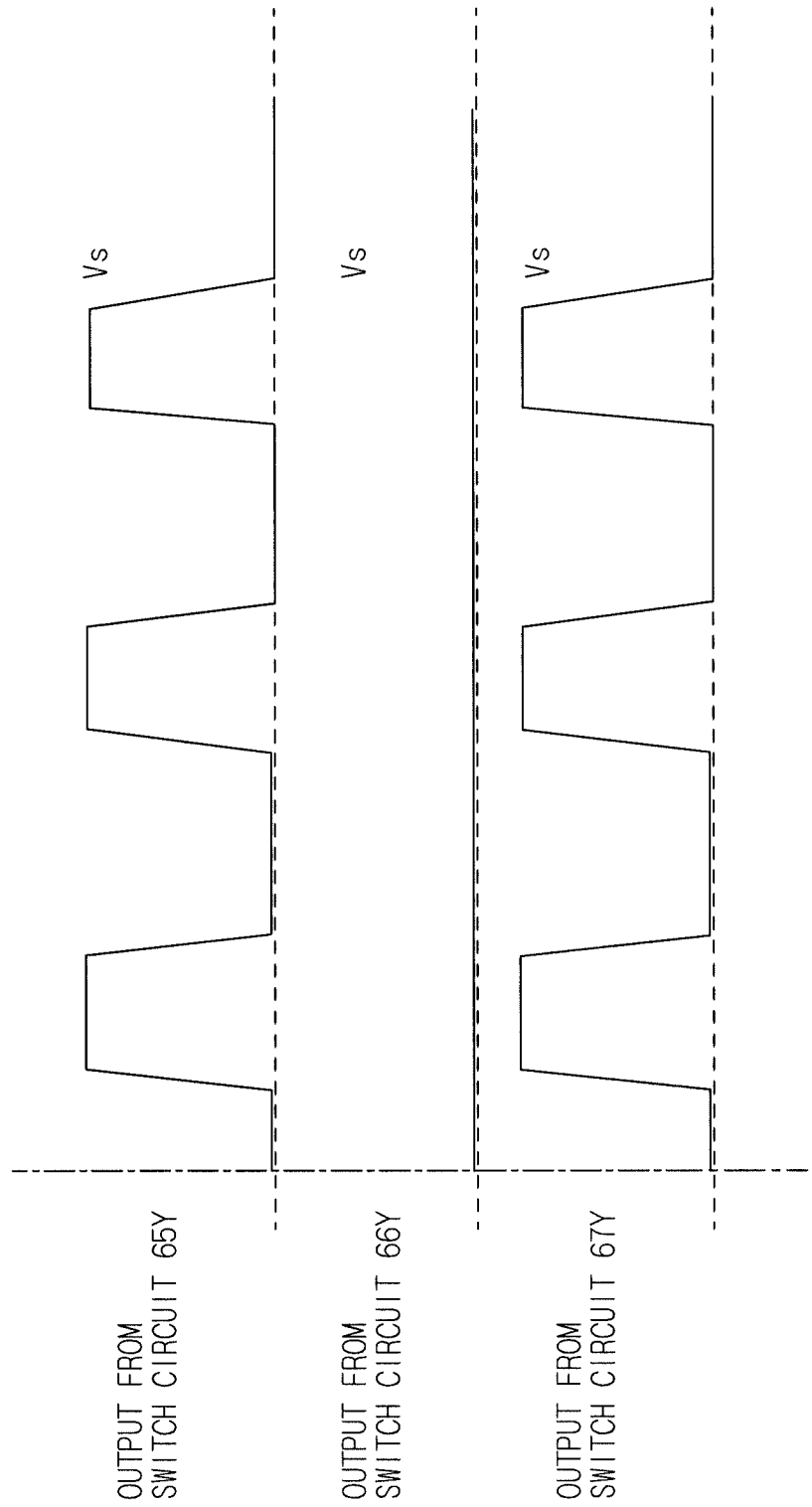

ULTRAVIOLET LIGHT IRRADIATION DEVICE

This application claims the priority benefit of Japanese Application No. 2010-061453, filed Mar. 17, 2010, the disclosure of which is incorporated in its entirety by reference.

BACKGROUND OF THE INVENTION

1. Field of the Invention

The present invention relates to an ultraviolet light irradiation device having a planar UV (ultraviolet) light source, particularly, an ultraviolet light irradiation device with an array of a plurality of thin plasma tubes arranged in parallel with each other as the UV light source.

2. Description of the Related Art

Conventionally, for example, extra high pressure mercury lamps and ultraviolet fluorescent lamps are employed widely as UV light sources used for ultraviolet light irradiation devices. Particularly, extra high pressure mercury lamps are often used as the UV light sources for semiconductor exposure apparatuses that require high irradiation intensity of ultraviolet light.

On the other hand, in the field of the ultraviolet light irradiation devices for medical use, the ultraviolet fluorescent lumps are mainly used as the UV light sources. Furthermore, in JP 2004-350946 A, a flat-type ultraviolet fluorescent lump which is composed of a discharge chamber formed by sealing the peripheral portions of two glass substrates and disposed to be opposed to each other is disclosed.

However, ultraviolet light irradiation devices in which extra high pressure mercury lamps, which are point light sources, or ultraviolet fluorescent lumps, which are line light sources, are used for UV light sources have a problem in that an optically complicated configuration is necessary in order to obtain ultraviolet light with uniform irradiation intensity in the range where ultraviolet light can be irradiated. For example, an ultraviolet light irradiation device with an extra high pressure mercury lamp used for its UV light source needs to have a configuration with a complex combination of optical components such as a reflector, a lens, a diffuser plate, and a wavelength selective filter in order to convert ultraviolet light into one with uniform irradiation intensity in the range where UV light can be irradiated from the point light source.

Furthermore, an ultraviolet light irradiation device with ultraviolet fluorescent lamps used for its UV light sources needs to have a configuration in which a plurality of ultraviolet fluorescent lamps are arranged in parallel with each other and, for example, a back surface reflector and a diffuser plate are combined together, in order to convert ultraviolet light into one with uniform irradiation intensity in the range where ultraviolet light can be irradiated from the line light source.

An ultraviolet light irradiation device with a flat-type ultraviolet fluorescent lamp described in JP 2004-350946 A (U.S. Pat. No. 7,241,306) used for its UV light source does not need to have an optically complicated configuration, since a planar light source is used instead of the line light source. However, the flat-type ultraviolet fluorescent lamp has a technical difficulty to form a large discharge chamber and therefore cannot be increased in size easily. Moreover, since the flat-type ultraviolet fluorescent lamp is configured with two glass substrates disposed to be opposed to each other, it has no is flexibility and therefore cannot configure a curved emitting surface of the UV light source.

Furthermore, the extra high pressure mercury lamps or the ultraviolet fluorescent lamps have a problem in that the irradiation intensity of UV light cannot be adjusted finely in a wide range.

SUMMARY OF THE INVENTION

The present invention is intended to provide an ultraviolet light irradiation device having a planar UV (ultraviolet) light source in which the irradiation intensity of UV light can be adjusted finely in a wider range.

In order to achieve the above-mentioned object, an ultraviolet light irradiation device according to a first invention comprises an ultraviolet light source that emits ultraviolet light and a housing that holds the ultraviolet light source, wherein the ultraviolet light source comprises: an array of a plurality of thin plasma tubes arranged in parallel with each other, each of which has a UV phosphor layer formed therein; a flexible support sheet supporting the array of a plurality of the thin plasma tubes; at least one electrode pair that is provided between the flexible support sheet and the thin plasma tubes; a drive circuit that applies a pulse voltage to the electrode pair; and a control circuit that controls a factor of the pulse voltage to be applied to the electrode pair by the drive circuit.

In the first invention, an array of a plurality of thin plasma tubes, each of which has the UV phosphor layer formed therein is used as UV light sources, and the factor of the pulse voltage can be controlled by the control circuit. Therefore, the irradiation intensity of ultraviolet light can be finely adjusted in a wider range.

An ultraviolet light irradiation device according to a second invention is configured in such a manner, in the first invention, that the control circuit controls at least one factor of a frequency and an amplitude of the pulse voltage to adjust the irradiation intensity of the ultraviolet light that is emitted from the thin plasma tubes.

In the second invention, the control circuit controls at least one factor of a frequency, a rising time and an amplitude of the pulse voltage. Therefore, the irradiation intensity of ultraviolet light can be finely adjusted in a wider range.

Furthermore, an ultraviolet light irradiation device according to a third invention is configured in such a manner, in the first or second invention, that the UV light source has a curved emitting surface along the flexible support sheet attached to the curved surface of the housing.

In the third invention, the flexible support sheet has flexibility. Accordingly, even when the housing of the ultraviolet light irradiation device is formed with a curved surface, the UV light source can be attached along the curved surface of the housing. Thus, the UV irradiation device having the curved UV light emitting surface is easily obtained.

An ultraviolet light irradiation device according to a fourth invention is configured in such a manner, in the first or second invention, that the flexible support sheet comprises a reflective layer that reflects light transmitted through a rear side of the thin plasma tubes to a front side direction.

In the fourth invention, as ultraviolet light emitted from the thin plasma tubes, not only emitting light but also reflected light from the rear side to the front direction can be used.

An ultraviolet light irradiation device according to a fifth invention is configured in such a manner, in the second invention, further comprising an irradiation intensity adjustment means associated with the control circuit controlling to vary the frequency of the pulse voltage for driving the thin plasma tubes.

In the fifth invention, since the number of times of the discharge emission per unit time duration can be changed by varying the frequency or pulse interval of the pulse voltage, the ultraviolet irradiation intensity can be easily and finely adjusted.

An ultraviolet light irradiation device according to a sixth invention is configured in such a manner, in the first or second invention, that a plurality of the electrode pairs are divided into a plurality of blocks, and that the ultraviolet light irradiation device further comprises a switch circuit that controls the pulse voltage to be applied to at least one electrode of the electrode pairs per each of the blocks.

In the sixth invention, the switch circuit controls, per block, the pulse voltage to be applied to at least one electrode of the electrode pairs. Therefore, ultraviolet light can be irradiated only in an arbitrary range within a range where ultraviolet light can be irradiated. Accordingly, it is possible to irradiate ultraviolet light in only a range where ultraviolet light needs to be irradiated.

An ultraviolet light irradiation device according to a seventh invention is configured in such a manner, in the first or second invention, that the flexible support sheet is attached to the housing detachably.

In the seventh invention, since the flexible support sheet is attached to the housing detachably, the ultraviolet light source can be attached or detached easily to the ultraviolet light irradiation device. Furthermore, with preparation of a plurality of flexible support sheets that are different in emission wavelength and size from each other, the ultraviolet light source can be replaced easily according to the intended use.

An ultraviolet light irradiation device according to an eighth invention is configured in such a manner, in the first or second invention, that the electrode pair is provided in the direction substantially orthogonal to the longitudinal direction of the thin plasma tubes in contact with a lower side outer surface of the thin plasma tubes, and that UV light is emitted from an upper side surface opposed to the electrode pairs.

In the eighth invention, the electrode pair is provided in the direction substantially orthogonal to the longitudinal direction of the thin plasma tubes in contact with a lower side outer surface of the thin plasma tubes. Therefore, a light emitting region and a non-light emitting region can be selected and UV light can be emitted without any obstruct such as electrodes. Accordingly, it is possible to irradiate ultraviolet light in only a range where ultraviolet light needs to be irradiated with high efficiency.

An ultraviolet light irradiation device according to a ninth invention is configured in such a manner, in the first or second invention, further comprising an irradiation range adjustment means associated with the control circuit outputting a range select signal so as to apply the pulse voltage to the selected electrode pairs from the drive circuit.

In the ninth invention, an irradiation range adjustment means is provided. Accordingly, the irradiation intensity of ultraviolet light and the range where ultraviolet light can be irradiated can be adjusted finely.

An ultraviolet light irradiation device according to a tenth invention is configured in such a manner, in the ninth invention, that the array of the thin plasma tubes comprises a visible light emitting thin plasma tube arranged every plurality of UV light emitting thin plasma tubes.

In the tenth invention, it is easy to visually confirm where the UV light is irradiated.

In the present invention, the irradiation intensity of ultraviolet light can be adjusted in a wider range as compared to the case where, for example, an extra high pressure mercury lamp or an ultraviolet fluorescent lamp is used for the ultraviolet light source. Furthermore, a selection of an electrode pair to which a pulse voltage is applied makes it possible to adjust the range where ultraviolet light can be irradiated.

BRIEF DESCRIPTION OF THE DRAWINGS

FIG. 8 is a timing chart showing the timing of each pulse voltage to be applied to X electrodes and Y electrodes through electrode connectors from pulse drive circuits in a circuit for driving and lighting the ultraviolet light source shown in FIG. 7.

FIG. 10 is a cross-sectional view showing the state where the ultraviolet light source according to Embodiment 1 of the present invention is held in a housing.

FIG. 14 is a timing chart showing the timing of each pulse voltage to be applied to Y electrodes by the switch circuits according to Embodiment 2 of the present invention.

BEST MODE FOR CARRYING OUT THE INVENTION

Embodiment 1

Figure 1:
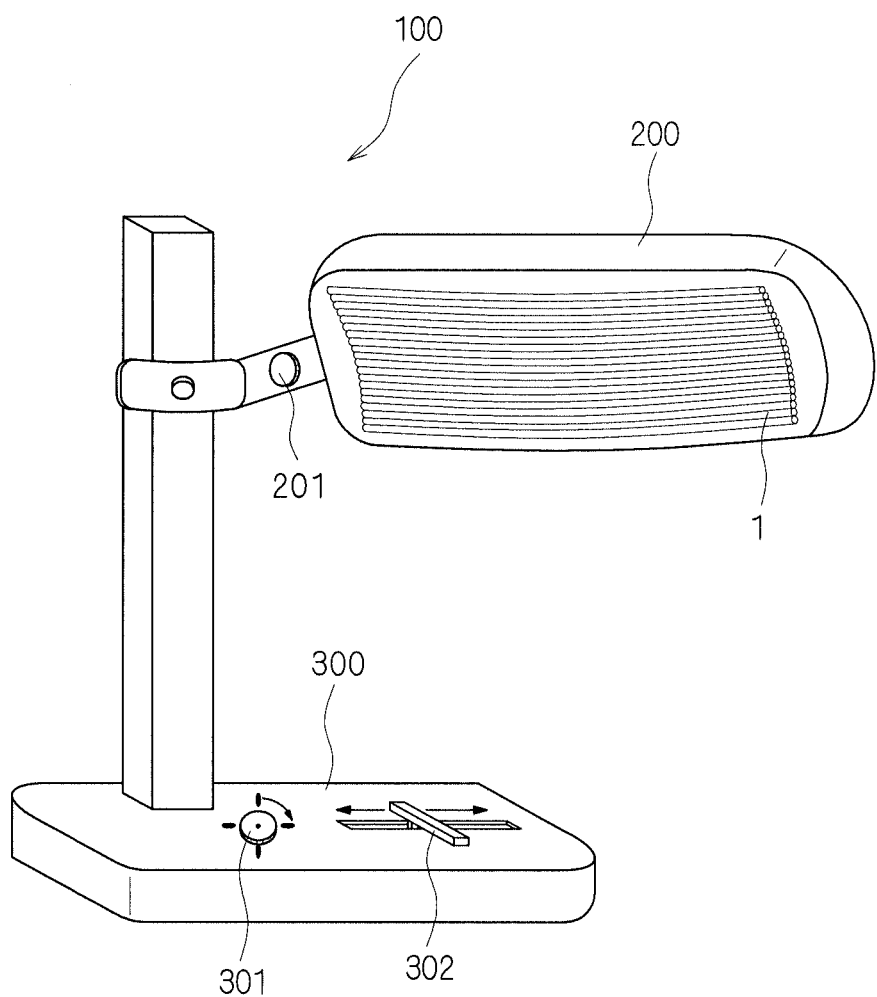
FIG. 1 is a schematic view showing the appearance of an ultraviolet light irradiation device according to Embodiment 1 of the present invention.

Hereinafter, an ultraviolet light irradiation device according to Embodiment 1 of the present invention is described in detail with reference to the drawings. FIG. 1 is a schematic view showing the appearance of the ultraviolet light irradiation device according to Embodiment 1 of the present invention. The ultraviolet light irradiation device 100 shown in FIG. 1 comprises an ultraviolet light source 1, a housing 200 that functions as a backboard for holding the ultraviolet light source 1 and accommodates a drive circuit, and a support stand 300 that supports the housing 200 and also serves as a control box. The ultraviolet light irradiation device 100 is an ultraviolet light irradiation device for medical use and is a therapy apparatus for irradiating ultraviolet light with a wavelength of UV-B band that is effective for a medical treatment of, for example, psoriasis, atopic dermatitis, or vitiligo. In the ultraviolet light irradiation device 100, the angle of irradiation of ultraviolet light can be adjusted by turning the irradiation angle adjustment dial 201 provided for the housing 200, and the frequency or the amplitude as a factor of a pulse voltage that drives the ultraviolet light source 1 are changed by turning the irradiation intensity adjustment dial 301 attached to the support stand 300 that also serves as a control box and thereby the irradiation intensity of ultraviolet light can be adjusted. Similarly, adjustment of the irradiation range adjustment slider 302 which outputs the range select signal makes it possible to adjust the range where ultraviolet light can be irradiated. The ultraviolet light source 1 comprises an array of a plurality of thin plasma tubes arranged in parallel with each other on a support sheet and has a curved emitting surface formed along the curved surface of the housing 200.

Figure 2:
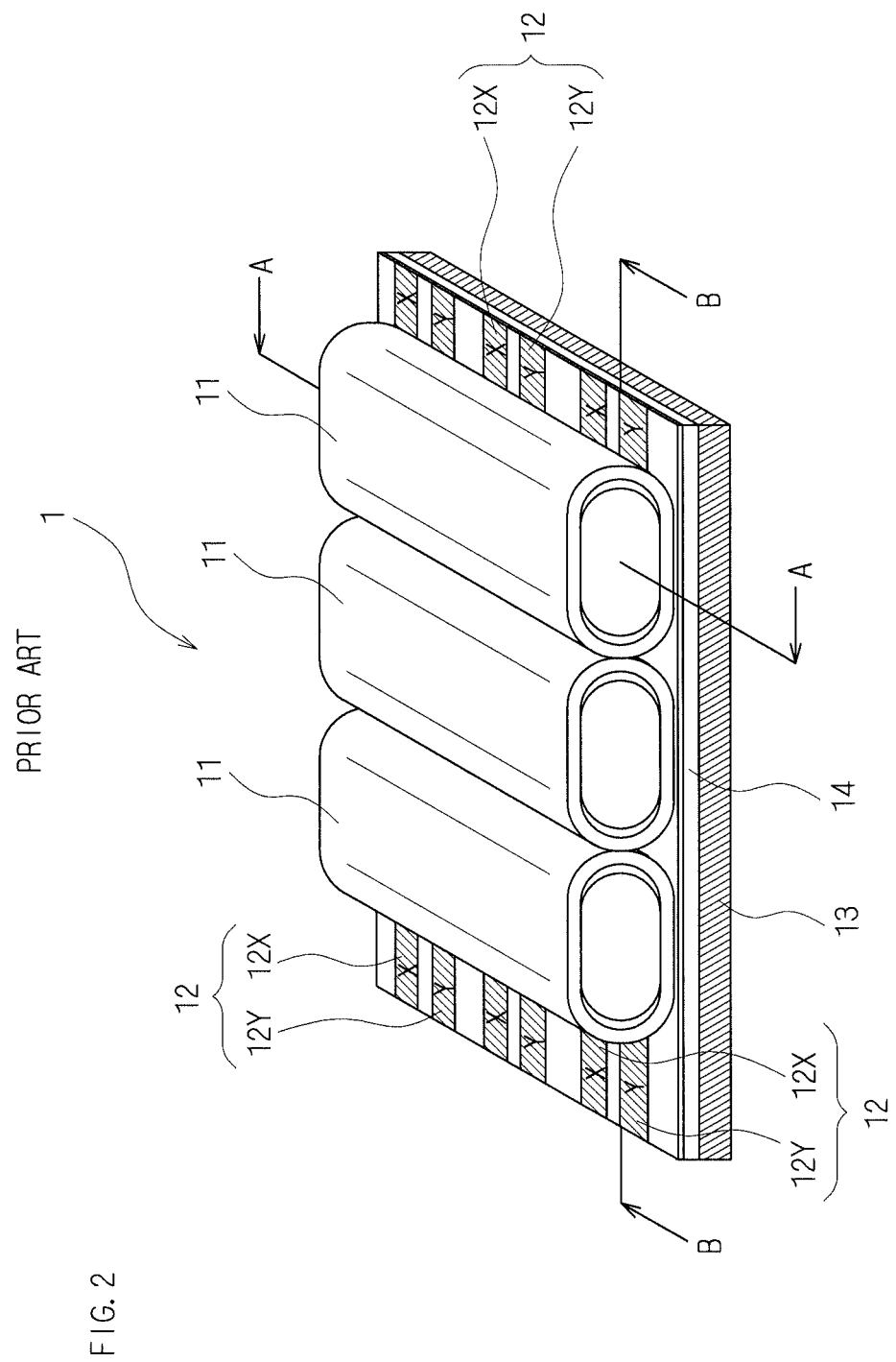
FIG. 2 is a perspective view showing the configuration of an ultraviolet light source according to Embodiment 1 of the present invention.

FIG. 2 is a perspective view showing the configuration of an ultraviolet light source according to Embodiment 1 of the present invention. As shown in FIG. 2, the ultraviolet light source 1 according to Embodiment 1 of the present invention comprises an array of a plurality of thin plasma tubes (or gas discharging thin tubes) 11, 11, and 11 arranged in parallel with each other on an electrode support sheet (or a flexible support sheet) 13. A plurality of thin plasma tubes 11, 11, and 11 each are filled with a discharge gas that emits ultraviolet light by a discharge. While being pre-patterned on the surface of the electrode support sheet 13, a plurality of electrode pairs 12, 12, and 12 are provided between the electrode support sheet 13 and the thin plasma tubes 11, 11, and 11 in the direction substantially orthogonal to the longitudinal direction of the thin plasma tubes 11. The thin plasma tubes 11 are elongated glass tubes. The size of the tube diameter is not particularly limited but is desirably approximately 0.5 to 5 mm when the cross-sectional shape at the plane orthogonal to the longitudinal direction of the thin plasma tube is, for example, a circular shape. The size of the ultraviolet light source 1 to be configured can be set arbitrarily by the length and the number of the thin plasma tubes 11 to be arranged. For example, by arranging 1000 pieces of thin plasma tubes 11, each of which has a diameter of 1 mm and a length of 1 m, an ultraviolet light source with approximately 1 m$^2$ can be produced easily. The cross-sectional shape at the plane orthogonal to the longitudinal direction of the thin plasma tube may be any shape, such as a circular shape, a semicircular shape, an elliptical shape, an oblate elliptical shape, or a rectangular shape. As shown in FIG. 2, the thin plasma tube 11 with a cross-section of an oblate shape including an oblate elliptical shape having flat portions and curved portions is preferable in that the flat portions can reliably provide a sufficient area to be in contact with the electrode pair 12.

Figure 3:
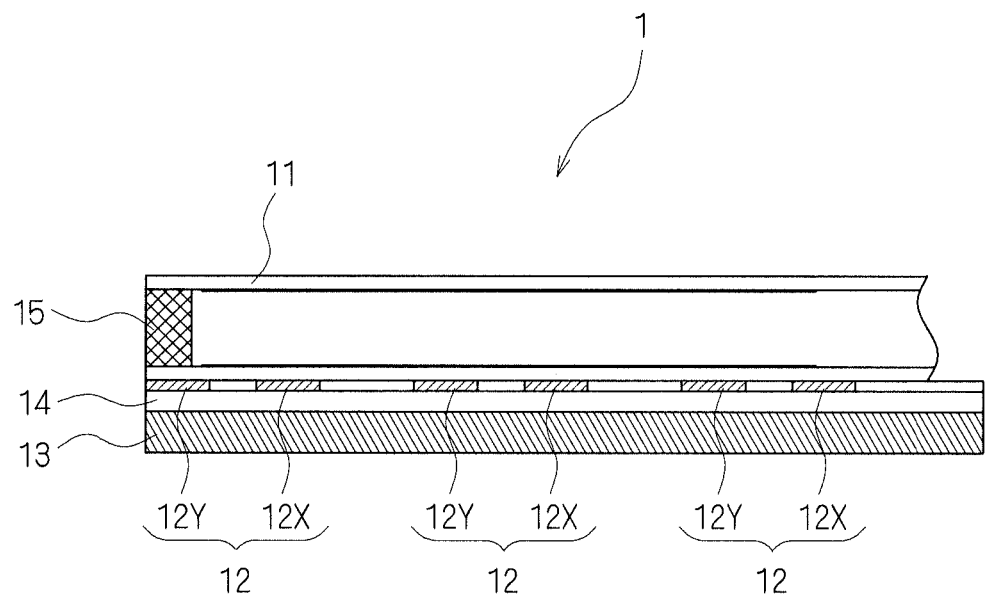
FIG. 3 is a cross-sectional view taken along line A-A of the ultraviolet light source shown in FIG. 2.

Furthermore, the thin plasma tube 11 is filled with a discharge gas mixture such as neon, xenon, and the like that emit ultraviolet light by a discharge of a predetermined mixing ratio at a predetermined pressure. As shown in FIG. 3, each of the end portions of the thin plasma tube 11 is sealed with a seal member 15 so that the discharge gas does not leak.

The electrode support sheet 13 located on the back side of the ultraviolet light source 1 is a sheet having flexibility (a flexible sheet) and is configured with, for example, a polycarbonate film or a PET (polyethylene terephthalate) film. Furthermore, the electrode support sheet 13 has on its surface a reflective layer 14 which is an insulating film or a coating that reflects light transmitted through the thin plasma tubes 11. The reflective layer 14 that serves as a foundation layer for the electrode pairs 12 is composed of an insulating material that reflects ultraviolet light transmitted through the thin plasma tubes 11. The reflective layer 14 also can be formed as a metal reflective film on the back face of the electrode support sheet 13. Furthermore, it also is possible to obtain a similar effect by mixing a powder of a reflective material such as titanium oxide into the resin film that configures the electrode support sheet 13. The ultraviolet light source 1 is not limited to one having a configuration in which a reflective layer 14 is provided and may have a configuration in which the reflective layer 14 is not provided.

A plurality of electrode pairs 12, 12, and 12 are provided on the electrode support sheet 13 (in the cases of FIGS. 2 to 4, on the surface of the insulating reflective layer 14) with a stripe-shaped pattern formed in the direction substantially orthogonal to the longitudinal direction of the thin plasma tubes 11. However, the electrode pairs 12 each are not limited to be provided particularly with the stripe-shaped pattern as long as they can generate a discharge in the thin plasma tubes 11 between adjacent electrodes. As shown in FIG. 3, the electrode pair 12 each is composed of a pair of an X electrode 12X and a Y electrode 12Y. The electrode pairs 12 each can be formed in a single layer or a multilayer using various materials known in the present field. Examples of the material that is used for the electrode pairs 12 include transparent conductive materials such as ITO (indium tin oxide) and $SnO_2$ as well as metal conductive materials such as Ag, Au, Al, Cu, and Cr. In order to ensure flexibility of electrodes on the film-shaped electrode support sheet 13, the electrode is preferably of a mesh pattern rather than a flat layer. Furthermore, the surface of the electrode pairs 12 located on the sides that are in contact with the thin plasma tubes 11 can be configured as a reflective surface and thereby the irradiation intensity of ultraviolet light can be improved further.

Various methods known in the present field can be used for the method of forming the electrode pairs 12 on the electrode support sheet 13. For example, they may be formed using a thick-film forming technique such as printing or may be formed using a thin-film forming technique that includes a physical deposition method or a chemical deposition method and a photolithography patterning technique. One example of the thick-film forming technique is screen printing. Examples of the physical deposition method among the thin-film forming techniques include a vapor deposition method and a sputtering method. Examples of the chemical deposition method include a thermal CVD method, a photo CVD method, and a plasma CVD method. The electrode support sheet 13 with a plurality of electrode pairs 12 formed on one surface thereof beforehand in this manner has a function as a back face support member for the thin plasma tubes 11. A plurality of thin plasma tubes 11 are arranged on the surface of the electrode support sheet 13, on which the electrode pairs 12 are formed, and are bonded thereto with an adhesive that is not shown in the drawings.

Figure 4:
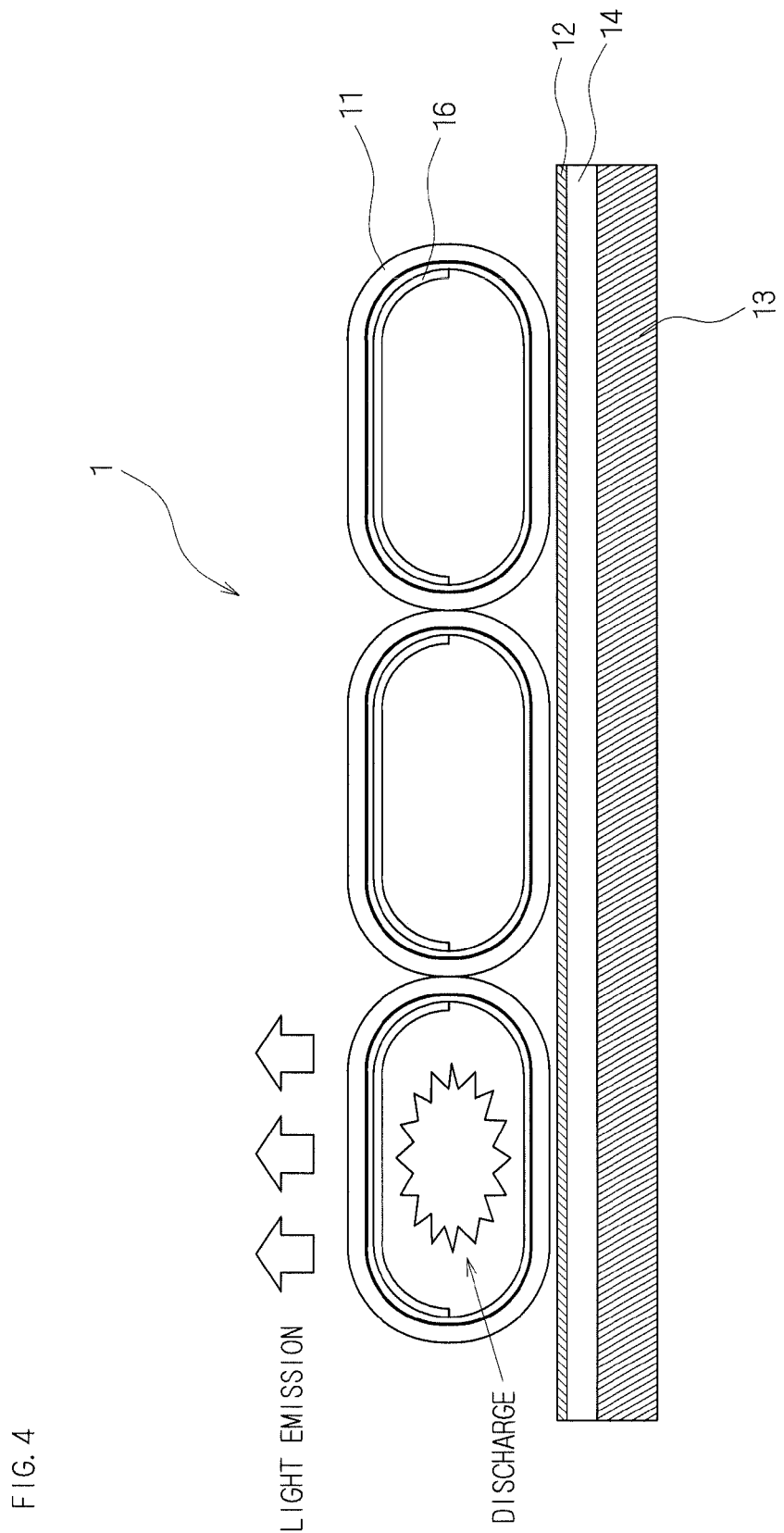
FIG. 4 is a cross-sectional view taken along line B-B of the ultraviolet light source shown in FIG. 2.

In the above-mentioned configuration, in order to obtain ultraviolet light with a predetermined wavelength from the thin plasma tubes 11, as shown in FIG. 4, UV phosphor layers 16, 16, and 16 are formed on an inner wall surface of the respective thin plasma tubes 11. The UV phosphor layers 16, 16, and 16 each are composed of a phosphor material that is excited by ultraviolet light emitted by a discharge and thereby emits ultraviolet light with a predetermined wavelength. Examples of the method that can be employed suitably as the method for forming the UV phosphor layers 16 on the inner wall surface of the thin plasma tubes 11 include a sedimentation method in which a slurry containing phosphor particles dispersed therein is injected into the thin plasma tubes 11 and phosphors settle down on one surface of the inner wall, a method in which a photosensitive phosphor coating liquid is introduced to carry out pattern exposure, and a method in which long and narrow gutter-shaped support members with phosphor layers 16 formed thereon are inserted into the thin plasma tubes 11.

Furthermore, in the case where the cross section of each thin plasma tube 11 has an oblate elliptical shape, the phosphor layer 16 that is formed on the inner wall surface of the thin plasma tube 11 may be formed on the whole inner wall surface, may be formed on both curved portions of the inner wall of the thin plasma tube 11 of an oblate elliptical shape shown in FIG. 2, or may be formed on an oblate inner wall surface on the side where ultraviolet light is emitted, of the thin plasma tube 11 as shown in FIG. 4.

As shown in FIG. 4, the UV phosphor layer 16 is excited by ultraviolet light emitted by a discharge of the thin plasma tube 11 and thereby ultraviolet light with a predetermined wavelength is transmitted through the UV phosphor layer 16 of the thin plasma tube 11 to be emitted. When the UV phosphor layer 16 is formed on the oblate inner wall surface on the side of the electrode support sheet 13, a reflective type UV light source is obtained, in which ultraviolet light to be emitted is reflected also by the phosphor layer 16.

An electron emission layer (omitted in the drawings) is formed on the inner wall surface of the thin plasma tube 11 that is in contact with a discharge gas. The electron emission layer is composed of an electron emission material with a higher secondary electron emission coefficient than that of the glass material that composes the plasma 11, for example, magnesium oxide (MgO). In this case, the electron emission material is not limited to MgO and may be a material that is used for a protective layer of a PDP (a plasma display panel), such as CaO, SrO, MgSrO, or SrCaO.

In FIG. 4, the ultraviolet light source 1 uses the UV phosphor layers 16, 16, and 16 to emit ultraviolet light with a predetermined wavelength (a wavelength that is different from that of ultraviolet light emitted by a discharge) excited by ultraviolet light emitted by a discharge. In addition to such a configuration, ultraviolet light emitted by a discharge may be used as it is, without the UV phosphor layers 16 formed on the inner wall surface of the thin plasma tubes 11. For example, when a mixed gas containing xenon is used, vacuum ultraviolet light in the far-ultraviolet region can be emitted without using phosphors. Furthermore, when using a mixed gas containing xenon as a discharge gas and further using rare-earth ultraviolet-emitting phosphors such as gadolinium (Gd) as a phosphor material for the UV phosphor layers 16, ultraviolet light (for example, UV-B band) with a different wavelength from that of ultraviolet light emitted by a discharge can be emitted. In the ultraviolet light source 1, it is necessary that a material that transmits ultraviolet light is used for the thin plasma tubes 11. Examples of the material that transmits ultraviolet light include silica glass ($SiO_2$), $MgF_2$, $CaF_2$, and LiF. In the ultraviolet light source 1, mercury that causes an environmental problem is not used unlike in the case of a conventional extra high pressure mercury lamp.

Figure 5:
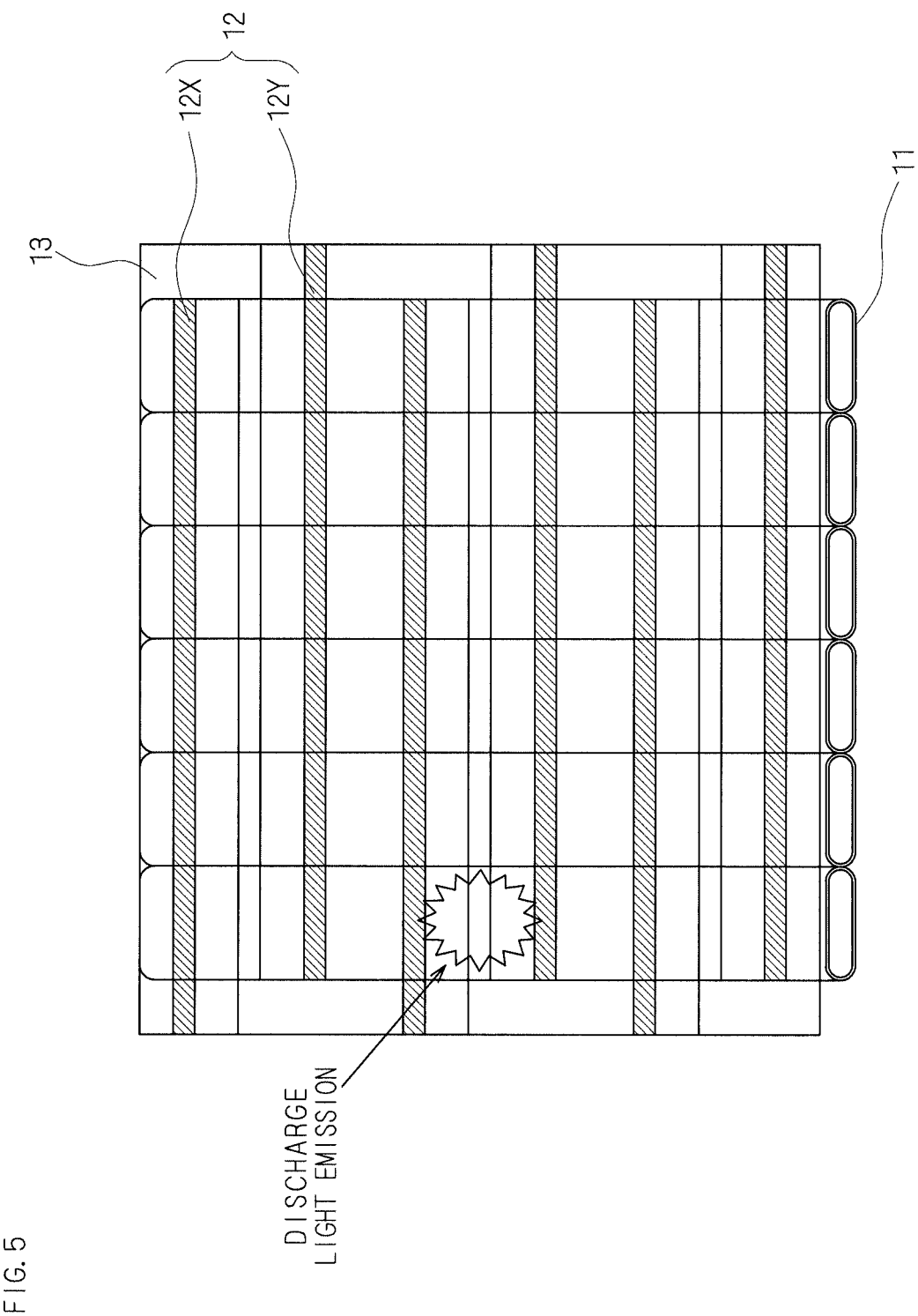
FIG. 5 is a schematic view showing the configuration of the ultraviolet light source according to Embodiment 1 of the present invention.

As shown in FIGS. 2 to 5, in the ultraviolet light source 1 according to Embodiment 1, the electrode pairs 12, 12, and 12 are provided as external electrodes that are in contact with a lower side outer surface of the flat portions of the thin plasma tubes 11, in the direction substantially orthogonal to the longitudinal direction of the thin plasma tubes 11, 11, and 11 that are arranged in parallel with each other, and carry out AC pulse drive. When a pulse voltage that is not lower than the threshold value of the voltage value that allows a discharge to be generated inside the thin plasma tubes 11 is applied alternately to the X electrode 12X and the Y electrode 12Y, a discharge of a so-called surface-discharge type is generated in the positions where the thin plasma tubes 11 and the electrode pairs 12 intersect with each other, in the thin plasma tubes 11. When application of a pulse voltage can be controlled per electrode pair 12, the on/off state of a discharge and an emission accompanying it can be controlled per line along the electrode pair 12. That is, in the ultraviolet light source 1, a light emitting region and a non-light emitting region can be selected in one thin plasma tube 11 as shown in FIG. 5. Accordingly, the irradiation intensity of ultraviolet light and the range where ultraviolet light can be irradiated can be adjusted finely.

Figure 6:
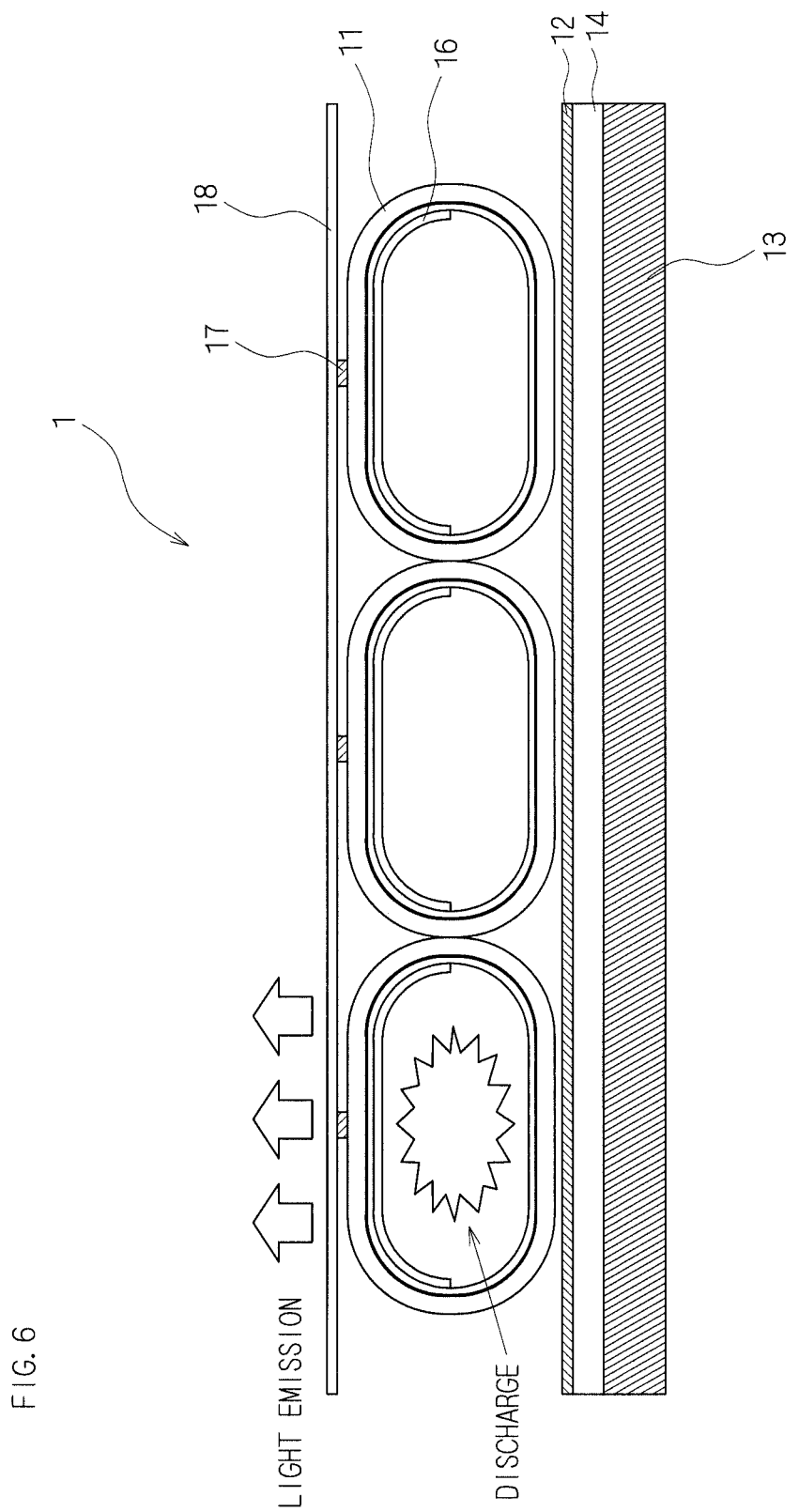
FIG. 6 is a cross-sectional view taken along line B-B of the ultraviolet light source with another configuration shown in FIG. 2.

FIG. 6 is a cross-sectional view taken along line B-B of the ultraviolet light source 1 with another configuration shown in FIG. 2. The ultraviolet light source 1 shown in FIG. 6 further comprises an upper electrode support sheet 18 having electrodes 17, 17, and 17 orthogonal to the electrode pairs 12, 12, and 12, and along the longitudinal direction of each thin plasma tube 11, and the under electrode support sheet 13 and the upper electrode support sheet 18 hold the array of a plurality of thin plasma tubes 11, 11, and 11 therebetween. Therefore, in the ultraviolet light source 1, a light emitting region and a non-light emitting region can be selected in every position where the electrode pairs 12, 12, and 12 and the electrodes 17, 17, and 17 intersect with each other. In this case, a material that transmits ultraviolet light is used for the upper electrode support sheet 18.

Figure 7:
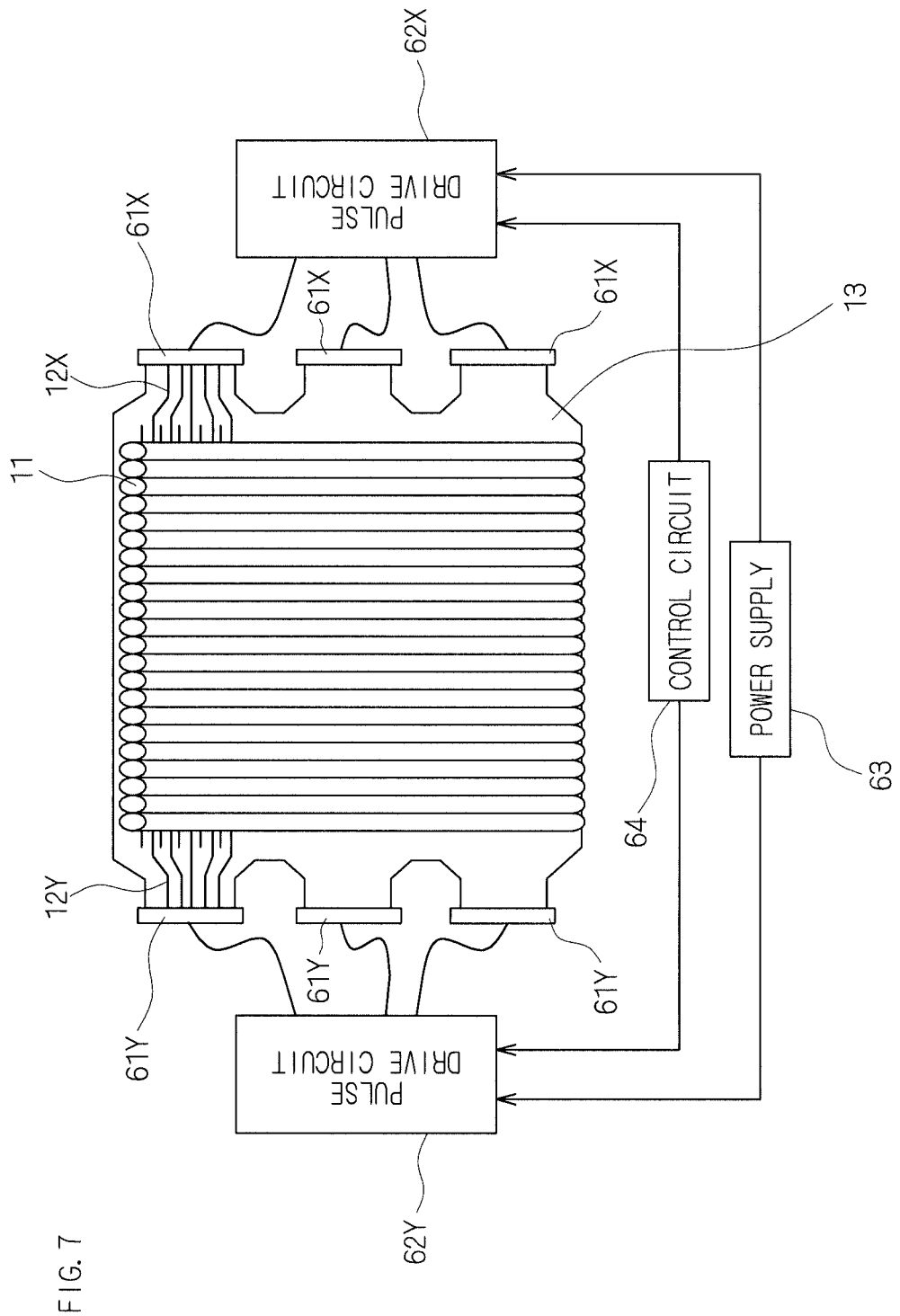
FIG. 7 is a circuit diagram showing the basic configuration of a circuit for driving and lighting the ultraviolet light source according to Embodiment 1 of the present invention.

FIG. 7 is a circuit diagram showing the basic configuration of a circuit for driving and lighting the ultraviolet light source 1 according to Embodiment 1 of the present invention. As shown in FIG. 7, the electrode pairs 12, 12, . . . are provided in the direction substantially orthogonal to the longitudinal direction of the thin plasma tubes 11, 11, . . . , the X electrodes 12X, 12X, . . . of the electrode pairs 12, 12, . . . are divided in the right hand terminals to be connected to a plurality of electrode connectors 61X, 61X, and 61X, respectively, according to the configuration of the connectors, and the Y electrodes 12Y, 12Y, . . . of the electrode pairs 12, 12, . . . also are divided in the left hand terminals to be connected to a plurality of electrode connectors 61Y, 61Y, and 61Y, respectively, according to the configuration of the connectors. The pulse drive circuit 62X (62Y) includes a timing signal generating circuit and a pulse signal generating circuit, is connected to the electrode connectors 61X, 61X, and 61X (the electrode connectors 61Y, 61Y, and 61Y), and applies a pulse voltage alternately to the X electrodes 12X, 12X, . . . and the Y electrodes 12Y, 12Y, . . . . The power supply 63 is a direct-current or alternating-current power supply connected to the pulse drive circuits 62X and 62Y and supplies electric power required for applying a pulse voltage to the X electrodes 12X, 12X, . . . and the Y electrodes 12Y, 12Y, . . . through the electrode connectors 61X, 61X, and 61X and the electrode connectors 61Y, 61Y, and 61Y. The control circuit 64 is connected to the pulse drive circuits 62X and 62Y, controls at least one factor of the frequency and the amplitude of the pulse voltage to be applied to the X electrodes 12X, 12X, . . . and the Y electrodes 12Y, 12Y, . . . from the pulse drive circuits 62X and 62Y through the electrode connectors 61X, 61X, and 61X and the electrode connectors 61Y, 61Y, and 61Y, and thereby adjusts the irradiation intensity of the ultraviolet light that is emitted from the thin plasma tubes 11, 11, . . . . For example, the irradiation intensity adjustment dial 301 shown in FIG. 1 is a means for varying the frequency (or a pulse interval) of the pulse voltage that drives the ultraviolet light source 1, and the irradiation intensity of ultraviolet light is adjusted by varying the frequency of the pulse voltage.

Figure 9A:
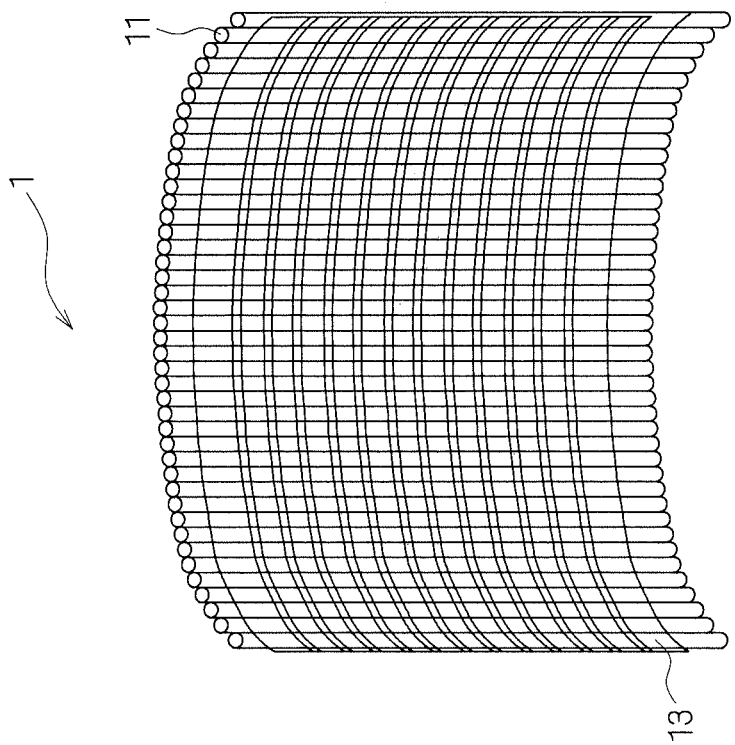
FIGS. 9A and 9B each are a schematic view showing flexibility of the ultraviolet light source according to Embodiment 1 of the present invention.
Figure 9B:
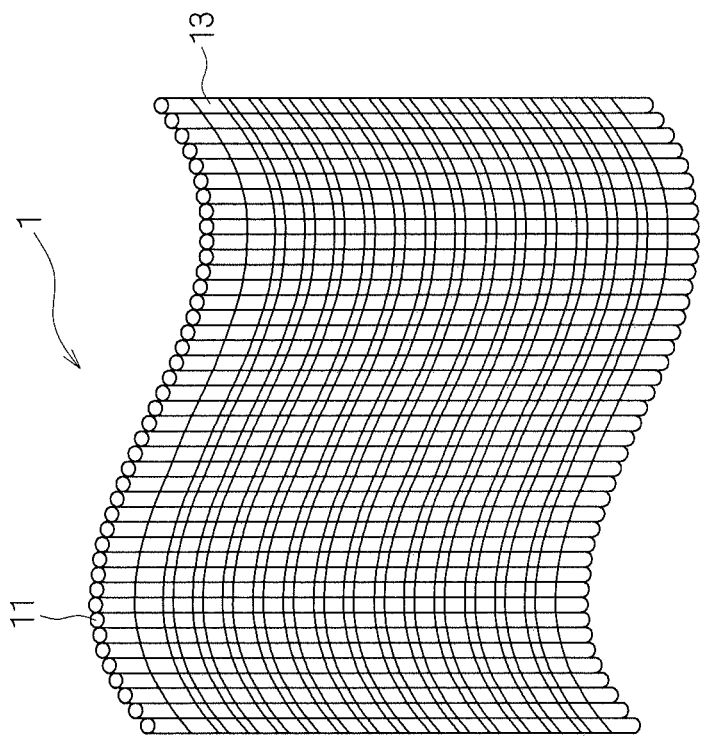

FIG. 8 is a timing chart showing the timing of each pulse voltage to be applied to the X electrodes 12X, 12X, ... and the Y electrodes 12Y, 12Y, ... through the electrode connectors 61 and 61Y from the pulse drive circuits 62 and 62Y in the circuit for driving and lighting the ultraviolet light source 1 shown in FIG. 7. The timing chart shown in FIG. 8 illustrates the manner in which the frequency of the pulse voltage (with a voltage value Vs) to be applied to each of the X electrode 12X and the Y electrode 12Y from time t1 to time t2, which is referred to as frequency f1, is changed to a higher frequency f2 (>f1) than the frequency f1 at time t2. Ultraviolet emission by a discharge of a discharge gas is repeated per pulse voltage. Accordingly, when the frequency of the pulse voltage is changed to a higher frequency (from f1 to f2), the number of times of discharge emission per unit time duration increases and thereby the overall irradiation intensity of ultraviolet light that is emitted from the thin plasma tubes 11, 11, ... increases. The amplitude of the pulse voltage to be applied alternately to the X electrode 12X and the Y electrode 12Y remains constant at a voltage value Vs even when the frequency of the pulse voltage is changed from the frequency f1 to the frequency f2, but the voltage value Vs may be varied to change the discharge intensity in the thin plasma tubes 11, 11, ... as long as it is in the range where a discharge is generated in the thin plasma tubes 11, 11, .... Furthermore, UV irradiation intensity may be changed by varying the rising time which is one factor of the pulse voltage. The thin plasma tube of this ac driven type has a characteristic that when the rising time of the pulse voltage becomes longer, the intensity of the discharge becomes weaker. Therefore the control circuit 64 associated with the irradiation intensity adjustment dial 301 may have a rising time control means for adjusting the irradiation intensity of UV light. Since the ultraviolet light source 1 according to Embodiment 1 of the present invention has a configuration in which an array of a plurality of the thin plasma tubes 11, 11, ... are arranged in parallel with each other on the electrode support sheet 13 having flexibility, it has flexibility with respect to the direction orthogonal to the longitudinal direction of the thin plasma tubes 11, 11, .... FIGS. 9A and 9B each are a schematic view showing flexibility of the ultraviolet light source 1 according to Embodiment 1 of the present invention. FIG. 9A shows a schematic view illustrating the appearance of the ultraviolet light source 1 that is arched by being curved with respect to the direction orthogonal to the longitudinal direction of the thin plasma tubes 11, 11, .... FIG. 9B shows a schematic view illustrating the appearance of the ultraviolet light source 1 that is formed into an S shape by being curved with respect to the direction orthogonal to the longitudinal direction of the thin plasma tubes 11, 11, .... Accordingly, an apparatus can be obtained easily in which the shape of the surface of the ultraviolet light source 1 on which ultraviolet light is irradiated is formed according to the shape of an object (for example, a human body) to which ultraviolet light is irradiated. FIG. 10 is a cross-sectional view showing the state where the ultraviolet light source 1 according to Embodiment 1 of the present invention is held in the housing 200. The portion that functions as a backboard of the housing 200 shown in FIG. 10 has a curved surface, and the ultraviolet light source 1 is curved with respect to the direction orthogonal to the longitudinal direction of the thin plasma tubes 11, 11, ... along the curved surface of the housing 200. The backboard of the housing 200 and the electrode support sheet 13 may be fixed to each other with an adhesive, but the electrode support sheet 13 may be attached to the housing 200 detachably using a member that can be detached easily, such as a hook-and-loop fastener. For example, a sheet with naps raised in a hook shape is attached to the rear surface of the periphery or distributed positions of the electrode support sheet 13 while a sheet with naps raised densely in a loop shape is attached to corresponding positions of the backboard of the housing 200, and the respective sheets are pressed against each other. In this case, the electrode support sheet 13 can be attached to the housing 200 easily. Detachable attachment of the electrode support sheet 13 to the housing 200 facilitates attachment and detachment of the ultraviolet light source 1 whose emission wavelength and size may vary, with respect to the ultraviolet light irradiation device 100.

Figure 11:
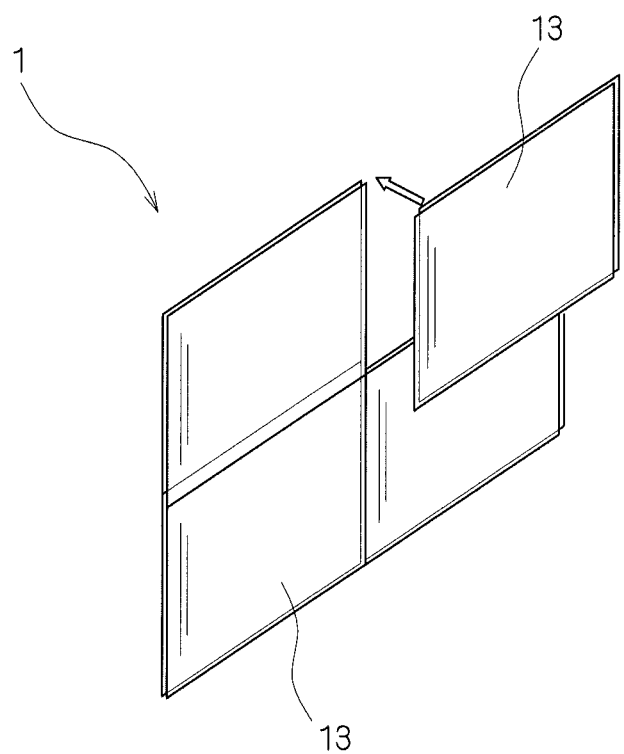
FIG. 11 is a schematic view showing the appearance of an ultraviolet light source having a configuration in which a plurality of electrode support sheets are arranged adjacently to each other.

The ultraviolet light source 1 may have a configuration in which it comprises a plurality of electrode support sheets 13 with the array of a plurality of thin plasma tubes 11, 11, ... arranged in parallel with each other, and a plurality of electrode support sheets 13 are arranged adjacently to each other. FIG. 11 is a schematic view showing the appearance of the ultraviolet light source 1 having a configuration in which a plurality of electrode support sheets 13, 13, 13, and 13 are arranged adjacently to each other. The ultraviolet light source 1 shown in FIG. 11 has a configuration in which for simplification, four flat electrode support sheets 13, 13, 13, and 13 are arranged adjacently to each other. However, the respective electrode support sheets 13 can be curved and thereby the ultraviolet light source 1 is allowed to have a tunnel shape that surrounds the object (for example, a human body) to which ultraviolet light is irradiated.

The ultraviolet light source 1 according to Embodiment 1 of the present invention is not limited to the configuration in which the electrode pairs 12, 12, 12 are provided in the direction substantially orthogonal to the longitudinal direction of the thin plasma tubes 11, 11, 11 as shown in FIG. 2. It may have a configuration, in which the electrode pairs 12, 12, 12 are provided along the longitudinal direction of the respective thin plasma tubes 11, 11, and 11.

Embodiment 2

Figure 12:
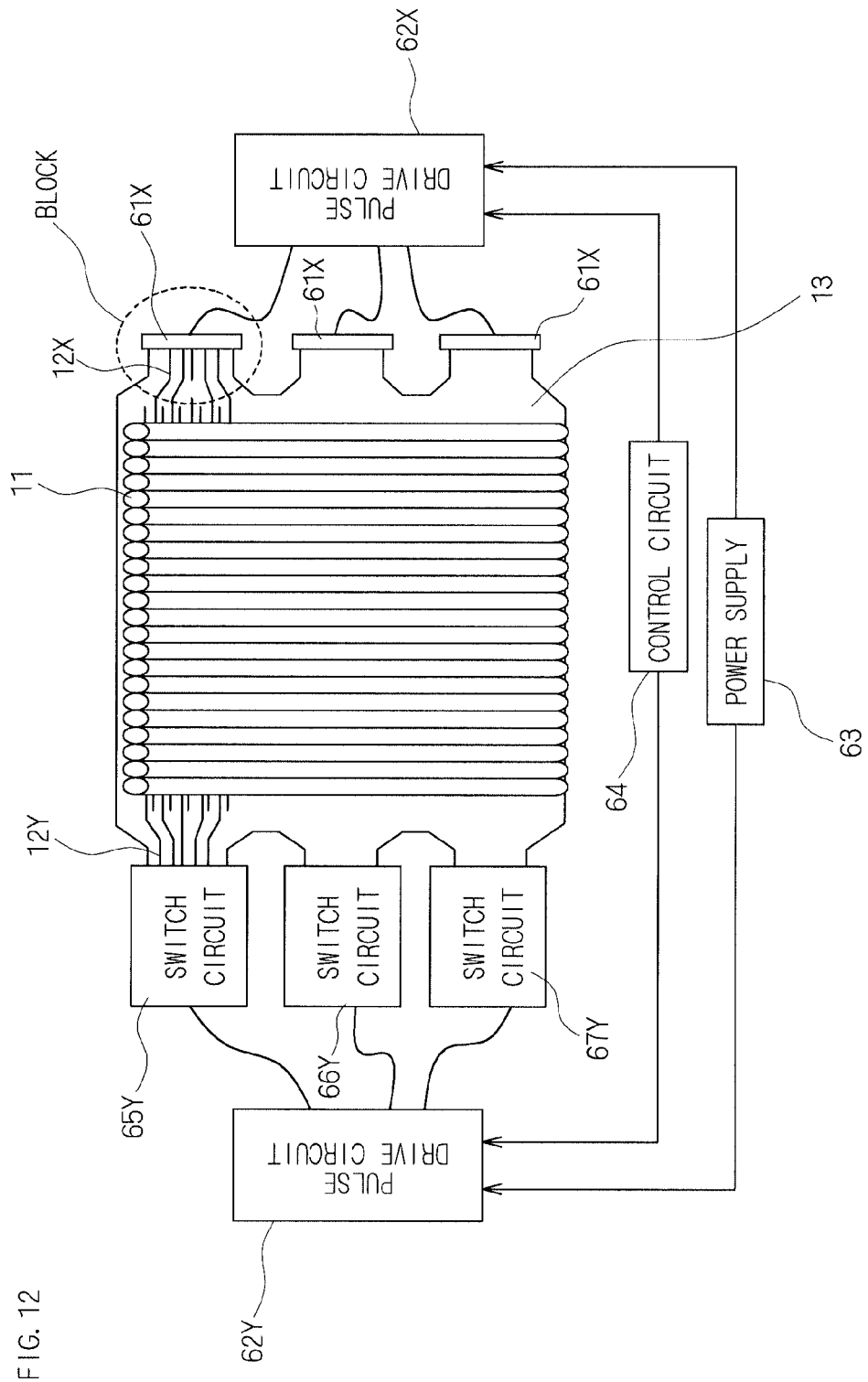
FIG. 12 is a circuit diagram showing the basic configuration of a circuit for driving and lighting an ultraviolet light source according to Embodiment 2 of the present invention.

An ultraviolet light irradiation device 100 according to Embodiment 2 of the present invention is identical to that according to Embodiment 1 except that the circuit configuration of the ultraviolet light source 1 is different in having a function of adjusting the range where ultraviolet light can be irradiated. Therefore, the detailed description thereof is not repeated. FIG. 12 is a circuit diagram showing the basic configuration of a circuit for selectively driving and lighting the ultraviolet light source 1 according to Embodiment 2 of the present invention. As shown in FIG. 12, the electrode pairs 12, 12, ... are provided in the direction substantially orthogonal to the longitudinal direction of the thin plasma tubes 11, 11, ... and the X electrodes 12X, 12X, ... are divided to be connected to a plurality of the electrode connectors 61X, 61X, and 61X, respectively, according to the configuration of the connectors, but the Y electrodes 12Y, 12Y, ... are divided to be connected to a plurality of switch circuits 65Y, 66Y, and 67Y, respectively, according to the configuration of the connectors that are not shown in the drawings. The pulse drive circuit 62X located on the X electrode 12X side includes a timing signal generating circuit and a pulse signal generating circuit, is connected to the electrode connectors 61X, 61X, and 61X, and applies a pulse voltage to the X electrodes 12X, 12X, .... The pulse drive circuit 62Y located on the Y electrode 12Y side includes a timing signal generating circuit and a pulse signal generating circuit, is connected to the switch circuits 65Y, 66Y, and 67Y, and applies a pulse voltage to the Y electrodes 12Y, 12Y, ....

Figure 13:
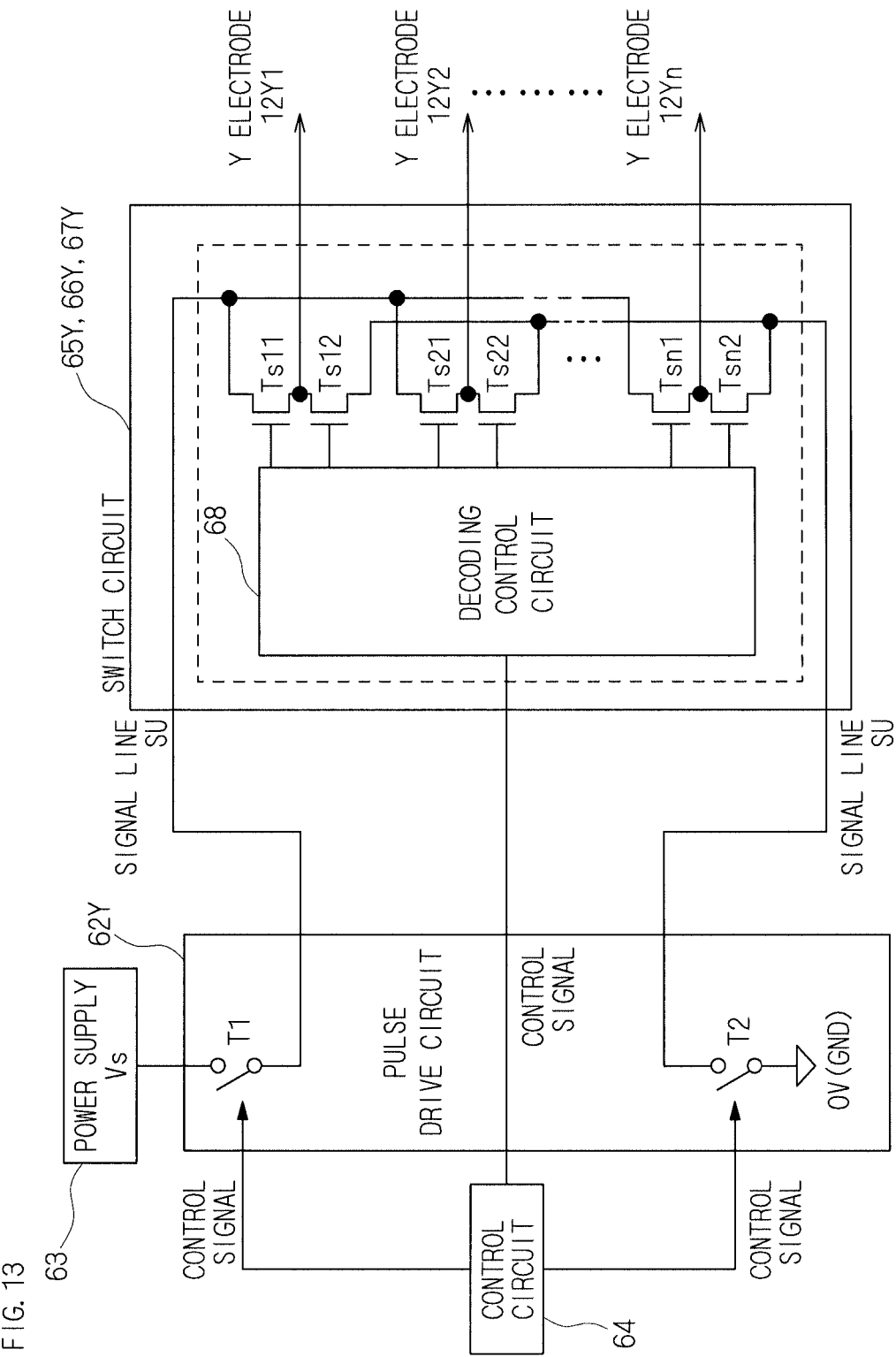
FIG. 13 is a circuit diagram showing the configuration of switch circuits according to Embodiment 2 of the present invention.

In the ultraviolet light source 1 according to Embodiment 2 of the present invention, the switch circuits 65Y, 66Y, and 67Y are provided that control the pulse voltage to be applied to the Y electrodes 12Y, 12Y, ... of the electrode pairs 12, 12, ... per block, with the electrode pairs 12, 12, ... being divided every n pairs of electrode pairs 12, 12, ... into three blocks. FIG. 13 is a circuit diagram showing the configuration of the switch circuits 65Y, 66Y, and 67Y according to Embodiment 2 of the present invention. The switch circuits 65Y, 66Y, and 67Y shown in FIG. 13 are provided with a decoding control circuit 68 and transistors Ts11, Ts12, Ts21, Ts22, ..., Tsn1, and Tsn2. The decoding control circuit 68 controls the on/off state of the transistors Ts11, Ts12, Ts21, Ts22, ..., Tsn1, and Tsn2 by a control signal containing a block selection signal sent from the control circuit 64. The transistors Ts11, Ts21, ..., and Tsn1 each apply a voltage with a voltage value Vs of the power supply 63 to the Y electrodes 12Y1, 12Y2, ..., and 12Yn when the transistor T1 of the pulse drive circuit 62Y is in the on state according to the control signal of the control circuit 64. The transistors Ts12, Ts22, ..., and Tsn2 ground the Y electrodes 12Y1, 12Y2, ..., and 12Yn to GND when the transistor T2 of the pulse drive circuit 62Y is in the on state according to the control signal of the control circuit 64.

Again, with reference to FIG. 12, the power supply 63 is a direct-current or alternating-current power supply connected to the pulse drive circuits 62X and 62Y and supplies an electric power required for applying a pulse voltage to the X electrodes 12X, 12X, ... and the Y electrodes 12Y, 12Y, ... through the electrode connectors 61X, 61X, and 61X and the switch circuits 65Y, 66Y, and 67Y. The control circuit 64 includes a means for adjusting the irradiation intensity of ultraviolet light that is connected to the irradiation intensity adjustment dial 301 shown in FIG. 1. The control circuit 64 controls at least one factor of the frequency and the amplitude of the pulse voltage to be applied to the X electrodes 12X, 12X, ... and the Y electrodes 12Y, 12Y, ... from the pulse drive circuits 62X and 62Y through the electrode connectors 61X, 61X, and 61X and the switch circuits 65Y, 66Y, and 67Y, and thereby adjusts the irradiation intensity of ultraviolet light that is emitted from the thin plasma tubes 11, 11, .... FIG. 14 is a timing chart showing the timing of each pulse voltage to be applied to the Y electrodes 12Y by the switch circuits 65Y, 66Y, and 67Y according to Embodiment 2 of the present invention. In the timing chart shown in FIG. 14, the pulse voltages (with a voltage value Vs) to be applied to two blocks of Y electrodes 12Y connected to the switch circuit 65Y and the switch circuit 67Y are output but the pulse voltage (with a voltage value Vs) to be applied to a block of the Y electrodes 12Y connected to the switch circuit 66Y is not output. Therefore, the regions inside the thin plasma tubes 11, 11, ... that intersect with the blocks of the Y electrodes 12Y connected to the switch circuit 65Y and the switch circuit 67Y each generate a discharge to emit ultraviolet light (the light emitting regions). However, the regions inside the thin plasma tubes 11, 11, ... that intersect with the block of the Y electrodes 12Y connected to the switch circuit 66Y each do not generate a discharge and therefore do not emit ultraviolet light (the non-light emitting region).

Such selection of the blocks of light emitting regions is executed by reading out an address code as the range select signal of a pattern of the light emitting region stored in the control circuit 64 according to the position of the irradiation range adjustment slider 302 shown in FIG. 1, decoding the address code thus read out, in the decoding control circuit 68, and thereby controlling the on/off state of the transistors Ts11, Ts12, Ts21, Ts22, ..., Tsn1, and Tsn2 of the respective switch circuits 65Y, 66Y, and 67Y block by block. Furthermore, the Y electrodes 12Y can control whether a pulse voltage is applied one by one by the address code read out from the control circuit 64. Therefore, they can control the light emitting regions corresponding to the electrode pairs 12 according to the object (for example, a human body) to which ultraviolet light is irradiated and thereby can adjust the range where ultraviolet light can be irradiated. Moreover, like the ultraviolet light source 1 shown in FIG. 6, when the electrodes 17 are provided in the direction that intersects with the electrode pairs 12, a selection circuit to which an address voltage is applied is connected to the electrodes 17, and the electrodes 17 are used as address electrodes, and thereby ultraviolet emission can be controlled in a matrix manner per region where an electrode pair 12 and an electrode 17 intersect with each other. Since ultraviolet light cannot be viewed, the change in the light emitting regions of the ultraviolet light source 1 according to the adjustment of the irradiation range adjustment slider 302 can be confirmed by using visible light-emitting phosphors instead of ultraviolet light-emitting phosphors for the phosphor layers 16 of the thin plasma tubes 11 every plurality of pieces (for example, 30 pieces) or every predetermined length (for example, 30 mm). Similarly, the change in the light emitting regions of the ultraviolet light source 1 according to the adjustment of the irradiation range adjustment slider 302 can be confirmed by drawing visual lines with a predetermined pattern vertically and horizontally with a fluorescent paint that is excited by ultraviolet light to emit visible light, on the electrode support sheet 13 with the thin plasma tubes 11 arranged thereon.

As described above, in the ultraviolet light irradiation device 100 according to Embodiment 2 of the present invention, the ultraviolet light source 1 is provided with the switch circuits 65Y, 66Y, and 67Y that control, per block or line, the voltage to be applied to at least one electrode (a Y electrode 12Y) of the electrode pairs 12, 12, .... Therefore, the light emitting region and the non-light emitting region can be selected in each of the thin plasma tubes 11, 11, ... or each of the regions inside the thin plasma tubes 11, 11, ... that intersect with the electrode pairs 12, 12, ... divided into a plurality of blocks. Accordingly, the range where ultraviolet light can be irradiated can be adjusted arbitrarily.

The ultraviolet light source 1 according to Embodiment 2 of the present invention is not limited to one having the configuration as shown in FIG. 12, in which the electrode pairs 12, 12, and 12 are provided in the direction substantially orthogonal to the longitudinal direction of the thin plasma tubes 11, 11, and 11, and may have a configuration in which they are provided along the longitudinal direction of the thin plasma tubes 11, 11, and 11 per thin plasma tube 11. In this case, the light emitting region and the non-light emitting region can be selected in each of the thin plasma tubes 11, 11, ... corresponding to the electrode pairs 12, 12, ... divided into a plurality of blocks and therefore can irradiate ultraviolet light in only an arbitrary range within the range where ultraviolet light can be irradiated.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An ultraviolet light irradiation device comprising an ultraviolet light source that emits ultraviolet light and a housing that holds the ultraviolet light source, wherein the ultraviolet light source comprises:
- an array of a plurality of thin plasma tubes arranged in parallel with each other, each of which has a ultraviolet phosphor layer formed therein,
- a flexible support sheet supporting the array of a plurality of the thin plasma tubes,
- at least one electrode pair that is provided between the flexible support sheet and the thin plasma tubes,
- a drive circuit that applies a pulse voltage to the electrode pair, and
- a control circuit that controls a factor of the pulse voltage,
- an irradiation intensity adjustment means that outputs an intensity adjustment signal to vary the irradiation intensity, and
- an irradiation range adjustment means that outputs a range select signal to vary the irradiation range, and
- the control circuit varies a frequency of the pulse voltage applying the electrode pair according to the intensity adjustment signal output from the irradiation intensity adjustment means, and controls the drive circuit to select the electrode pair by block to be applied the pulse voltage according to the range select signal output from the irradiation range adjustment means.

2. The ultraviolet light irradiation device according to claim 1, wherein the ultraviolet light source has a curved emitting surface along the flexible support sheet attached to the curved surface of the housing.

3. The ultraviolet light irradiation device according to claim 2, wherein the flexible support sheet supports a rear side of the thin plasma tubes, and comprises a reflective layer that reflects light transmitted through the rear side of the thin plasma tubes to a front side direction, on the rear side of the thin plasma tubes.

4. The ultraviolet light irradiation device according to claim 2, wherein the ultraviolet light source is attached to the housing detachably by a planate fastener between the rear side of the flexible support sheet and the curved surface of the housing.

5. The ultraviolet light irradiation device according to claim 1, wherein the electrode pair is provided in a direction substantially orthogonal to a longitudinal direction of the thin plasma tubes in contact with a lower side outer surface of the thin plasma tubes, and ultraviolet light is emitted from an upper side surface opposed to the electrode pairs.

6. The ultraviolet light irradiation device according to claim 1, wherein the array of the thin plasma tube comprises a visible light emitting thin plasma tube arranged every plurality of ultraviolet light emitting thin plasma tubes.

* * * * *

UNITED STATES PATENT AND TRADEMARK OFFICE
CERTIFICATE OF CORRECTION

PATENT NO.       : 8,796,949 B2
APPLICATION NO.  : 13/045954
DATED            : August 5, 2014
INVENTOR(S)      : Kenji Awamoto et al.

Page 1 of 1

It is certified that error appears in the above-identified patent and that said Letters Patent is hereby corrected as shown below:

In the Claims

Column 13, Line 21, In Claim 1, After "applied" insert -- to --.

Signed and Sealed this
Eighteenth Day of November, 2014

Michelle K. Lee
*Deputy Director of the United States Patent and Trademark Office*